United States Patent Office 3,334,423
Patented Aug. 8, 1967

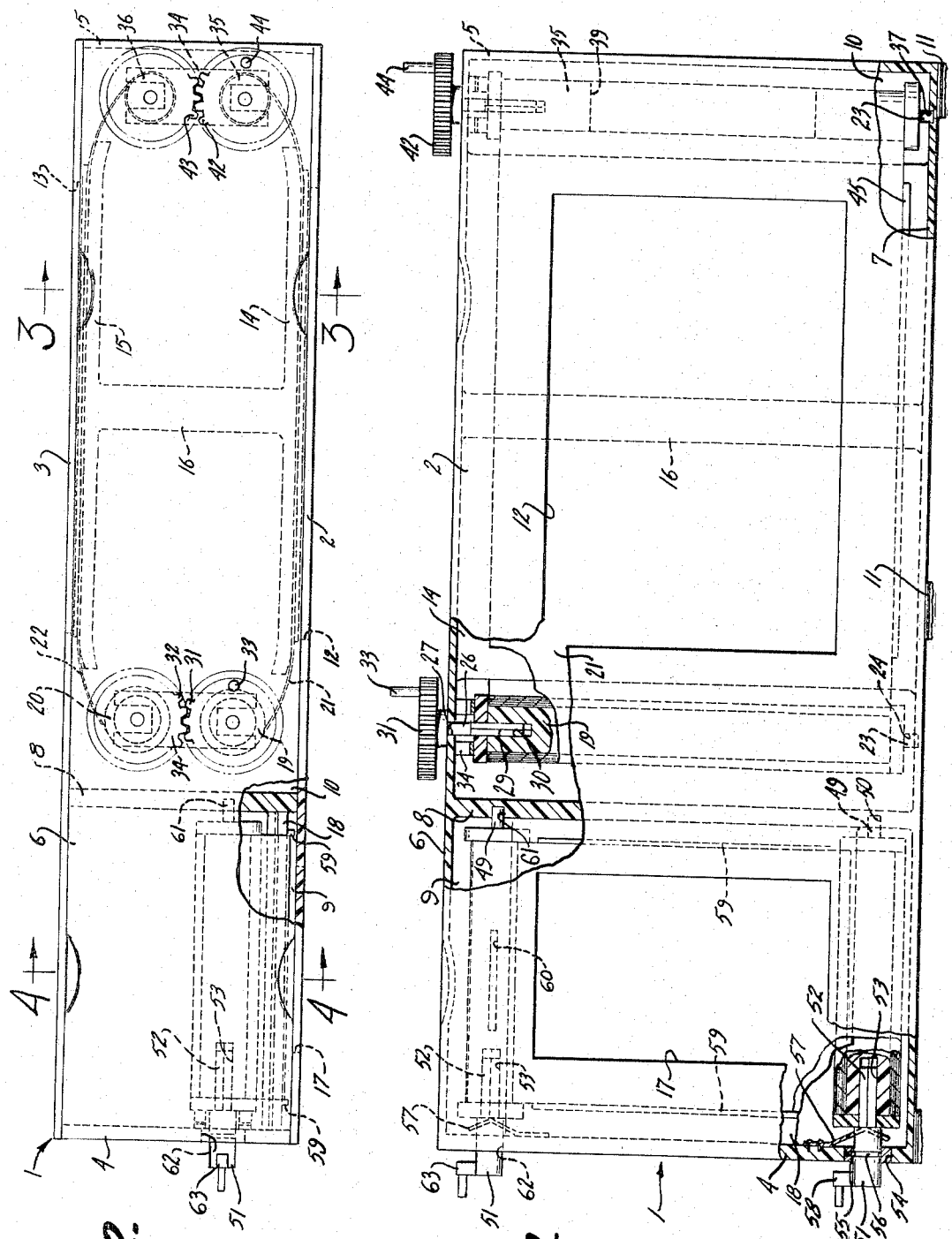

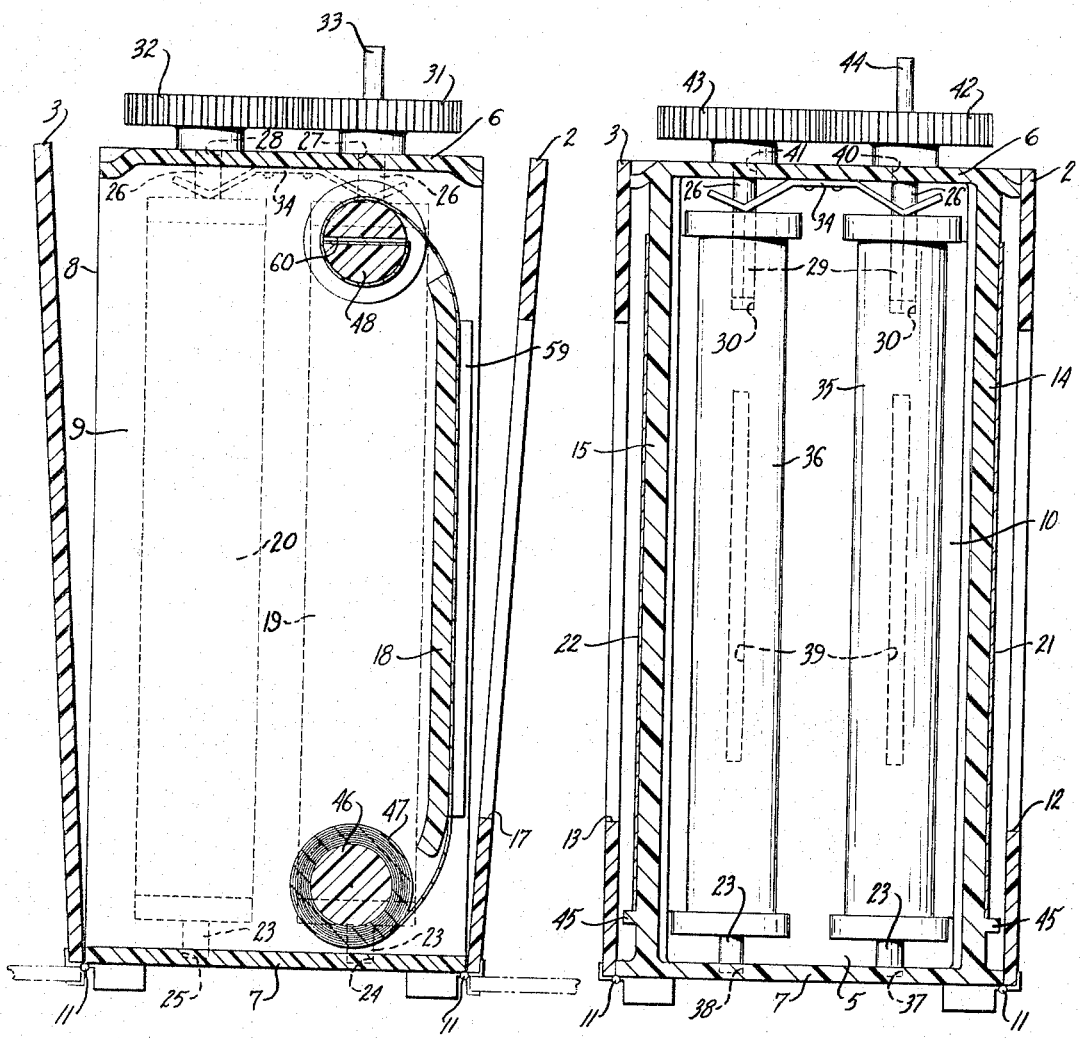

3,334,423
TEACHING MACHINE
Lois Hintze, 4967 N. Ardmore Ave.,
Whitefish Bay, Wis. 53217
Filed Dec. 8, 1964, Ser. No. 416,751
15 Claims. (Cl. 35—9)

This invention relates to teaching machines and more particularly to such machines which can be programmed for a variety of materials.

Numerous types of teaching machines are currently available on the market. Generally, machines designed for programmed learning are expensive and therefore not as widely used as they might be. Some teaching machines are complicated to a degree that use without adult assistance is inadvisable—particularly at primary level. Generally, too, the available machines are designed for use by a single pupil at a given time. Because the interest and the attention span of a student can often be increased when opportunity for verbal response in a group situation is provided, and since it is often desirable to stimulate critical thinking by oral exchange of ideas and opinions, it is an object of this invention to include oral respondency as a measurer of learning in programmed learning, in addition to the more usual written response. It is generally an object of this invention to provide a teaching machine which is adapted primarily for group use and is adequately simple so that even pupils in the lower grades of school can readily learn to operate and use it. It is believed, too, that the machine of this invention will be relatively inexpensive so that it could be more widely used in schools and even as a game or toy would be in the home.

Generally the teaching machine of this invention comprises a box-like structure including front and rear walls and as shown in the accompanying drawings may further include a pair of adjacent compartments disposed oppositely with respect to a transverse plane relative to the walls. One of the compartments is provided with a window in the front wall and visual intelligence indicia means are exposed for viewing in the window. The other compartment is provided with a window in both the front and rear walls. Visual intelligence indicia means are provided in the latter compartment and may comprise corresponding flexible tapes for viewing before the respective windows and driven by means adapted to move the tapes synchronously past the windows.

The drawings furnished herewith illustrate the best mode for carrying out the invention as presently contemplated and set forth hereinafter.

In the drawings:

FIGURE 1 is an elevational view with parts broken away and sectioned showing the teaching machine of this invention;

FIG. 2 is a plan view with parts broken away and sectioned of the teaching machine;

FIG. 3 is an enlarged sectional view taken generally on line 3—3 of FIG. 2; and

FIG. 4 is an enlarged sectional view taken generally on line 4—4 of FIG. 2 and shows the front and rear walls partially opened and in phantom line shows the walls in their wholly opened position.

Referring to the drawings, the teaching machine of this invention generally comprises a box-like structure 1 having opposed side walls 2 and 3 designated front and rear, respectively, end walls 4 and 5, a top 6 and bottom 7. The box-like structure 1 is divided by a transverse vertical partition wall 8 or the like to present adjacent compartments 9 and 10 within the structure. The front and rear walls 2 and 3 are secured to the bottom 7 by suitable hinges 11 and are adapted to swing open to a generally flat condition to provide access to the workings within compartments 9 and 10.

Viewing windows or sight openings 12 and 13 open into compartment 10 and are provided in the front and rear walls 2 and 3, respectively, generally centrally between the compartment end walls 5 and 8. Rigid backing plates 14 and 15 extend vertically between the top 6 and bottom 7 and are spaced inwardly a relatively short distance from the front and rear walls 2 and 3, respectively. The plates 14 and 15 generally parallel the walls 2 and 3 at the window area and have inwardly curving end portions which terminate in spaced relation from the end walls 5 and 8 of compartment 10. A vertical reinforcing plate 16 extends generally centrally between the backing plates 14 and 15 to enhance the rigidity of the plates.

A viewing window or sight opening 17 opens into compartment 9 being provided in front wall 2 generally centrally between the compartment end walls 4 and 8. A rigid backing plate 18 is spaced inwardly a relatively short distance from the front wall and extends between the walls 4 and 8. Backing plate 18 generally parallels the front wall 2 at the window area and is provided with inwardly curving end portions which terminate in spaced relation from the top 6 and bottom 7. The respective viewing windows 12, 13 and 17 are adapted for a showing of visual intelligence indicia means such as the programmed tapes described hereinafter.

The mechanism within compartment 10 provides for the passage of programmed tapes for viewing before the respective windows 12 and 13 and in the normal use of the machine selected feed spools 19 and 20 having oppositely wound programmed tapes 21 and 22 are placed vertically and in parallel relation within the machine adjacent the compartment end wall 8. The spools 19 and 20 may be provided with an axially extending stub shaft 23 at the lower ends thereof which are rotatably received in corresponding transversely spaced and aligned bearing cavities 24 and 25 provided in the bottom 7 of the box-like structure.

Removable drive means for the respective feed spools 19 and 20 extend through the top 6 of the box-like structure and include a shaft 26 rotatable within suitable bearing openings 27 and 28 axially aligned with the corresponding bearing cavities 24 and 25 in the bottom 7 of the structure. The lower ends of shaft 26 terminate with a generally square section portion 29 which is adapted to engage within a complementary axial recess 30 in the upper end of spools 19 and 20 to drivingly interlock the respective spools to the corresponding shafts.

The portions of shaft 26 projecting above the top 6 of the structure carry identical gears 31 and 32 which are fixed onto the corresponding shaft and meshingly engaged to drive the spools 19 and 20 synchronously. An axially offset crank handle 33 is provided on gear 31 to manually drive the spools 19 and 20.

To remove spools 19 and 20 from the machine the shafts 26 are moved axially upwardly relative to their respective bearing openings 27 and 28 until the corresponding spool recess 30 are cleared or the shafts removed completely from their bearings openings. Upon disengagement of shafts 26 from their corresponding spool recesses 30, the respective spools 19 and 20 will remain conveniently upright under the influence of the dual bifurcated leaf spring 34 which is secured to the top 6 of the structure and bears against the tops of the spools on opposed sides of recesses 30. With corresponding shaft 29 disengaged from the spool, removal is effected by lifting the spool against the biasing spring 34 to clear the corresponding stub shaft 23 from its lower bearing cavity and thereafter moving the spool transversely out of compartment 10.

When inserting the spools 19 and 20 into the machine, it will be necessary to push the spring 34 upwardly to properly seat the respective stub shafts 23 in the corresponding bearing cavities in the bottom 7 of the machine. To engage the spool drive means, it may be necessary to rotate the spool and the corresponding shafts 26 relative to each other to properly engage and seat the square shaft portion 29 within the complementary spool recess 30.

The take-up spools 35 and 36 for the programmed tapes 21 and 22 are disposed on the opposite end of compartment 10 adjacent the end wall 5. Spools 35 and 36 may be generally similar to the feed spools 19 and 20 and may be similarly mounted having their lower stub shafts 23 rotatably disposed in the transversely spaced and aligned bearing cavities 37 and 38 in the machine bottom 7. Means are provided for removably securing the ends of the tapes 21 and 22 to the corresponding spools 35 and 36 and may take the form of a longitudinally extending through slot 39 in the respective spools. Dual spring means 34 also bear against the top surfaces of the spools 35 and 36.

While the take-up spools 35 and 36 normally need not be removed from the machine, the drive means therefor are generally similar to the feed spool drive means and include the removable shafts 26 having square section end portion 29 engageable within complementary recesses 30 of the corresponding take-up spools. The shafts 26 for the respective take-up spools 35 and 36 extend through the bearing openings 40 and 41 axially aligned with the corresponding bearing cavities 37 and 38. The portions of the take-up spool shafts 26 which project upwardly from the respective bearing openings 40 and 41 fixedly mount the identical gears 42 and 43 which are meshingly engaged to synchronously drive the take-up spools 35 and 36. An axially offset crank handle 44 is provided on gear 42 to manually drive the take-up spools.

In the normal use of the mechanism associated with compartment 10 of the teaching machine, selected feed spools 19 and 20 are inserted into the machine. The programmed tape 21 of feed spool 19 is threaded through the space between backing plate 14 and the front wall 2 and the end portion of the tape is removably secured to the take-up spool 35 by insertion in the slot 39. The programmed tape 22 of feed spool 20 is similarly threaded between backing plate 15 and rear wall 3 and removably secured to take-up spool 36. The tapes 21 and 22 may be guided over the respective backing plates 14 and 15 by a projecting longitudinally extending rib 45 on each backing plate which aids in assuring proper alignment of the tapes relative to the corresponding spools and window openings 12 and 13. If the tapes 21 and 22 are not initially synchronized each to the other, it will be necessary to advance one of the tapes relative to the other which is readily accomplished by lifting shafts 26 for the tape to be advanced to thereby disengage the corresponding gears form the mating gears and then turning the raised shafts along with the corresponding spools to provide the desired advance. After the tapes 21 and 22 are synchronized and the respective gears reengaged, the tapes may be advanced synchronously by turning the crank handle 44 of gear 42 in the appropriate direction. After the viewing areas on tapes 21 and 22 or a desired portion thereof has been exposed, the tapes are rewound onto the feed spools 19 and 20 for storage by turning the crank handle 33 of gear 31 in the appropriate direction. The resistance imposed on the spools by springs 34 provides a desired degree of tension on the tapes 21 and 22 during the wind and rewind operations.

The mechanism in compartment 9 includes a pair of vertically spaced, horizontally disposed parallel spools of which the lower spool 46 is shown to be a feed spool for the programmed tape 47 and the upper spool 48 a take-up spool. The spools 46 and 48 provide for movement of tape 47 in a direction at right angles to the direction of movement for tapes 21 and 22 in compartment 10.

The feed spool 46 is insertable from the rear of the machine and is provided with an axially extending stub shaft 49 which is rotatably disposed within the bearing cavity 50 in the partition wall 8. The opposite end of the feed spool 46 is engaged by the removable drive shaft 51 which includes a square section terminal portion 52 drivingly disposed within the complementary axial recess 53 in the spool. The shaft 51 extends through the end wall 4 of the box-like structure and is rotatably mounted in the bearing opening 54 axially aligned with the bearing cavity 50. A spring-biased ball detent 55 is associated with the bearing opening 54 and is engageable within a circumferential groove 56 of shaft 51 to removably secure the shaft axially relative to the bearing opening. The bifurcated leaf spring 57 secured to end wall 4 and bearing on the adjacent end surface of spool 46 assists in holding the spool in place when the shaft 51 is removed and imposes a tension on the tape 47 during winding. A crank 58 is provided on shaft 51 externally of end wall 4 to drive the spool 46.

The programmed tape 47 is threaded between the front wall 2 and the backing plate 18, being guided between spaced ribs 59 on the backing plate, and is removably secured to the take-up spool 48 by means of the longitudinal through slot 60. The spool 48 is generally similar to feed spool 46 and is similarly mounted with its stub shaft 49 rotatably disposed within the bearing cavity 61 vertically spaced and aligned with bearing cavity 50 in the partition wall 8. The drive shaft 54 for take-up spool 48 is rotatably disposed in the bearing opening 62 in wall 4 and in axial alignment with the bearing cavity 61. The crank 63 is provided on shaft 51 externally of wall 4 to drive the take-up spool 48.

The drive associated with the mechanism of compartment 9 is completely independent of that for compartment 10. The contents on the programmed tape 47 is exposed in the window opening 17 by turning crank 63 to wind the tape onto the take-up spool 48. After the tape 47 or a desired portion thereof has been exposed, the tape is rewound for storage onto the feed spool 46 by turning the crank 58.

In the normal use of the teaching machine of this invention when working with a plurality of pupils, it is contemplated that the subject matter for study will be presented on tape 47 as viewed in window opening 17 of compartment 9. Appropriate questions pertaining to the subject matter under study are presented on tape 21 as viewed in window 12 at the front of compartment 10, while the corresponding answers are available on tape 22 as viewed in window 13 at the rear of the machine. Since the mechanism of the several compartments is independently driven, the pace of presentation may vary between the compartments and is completely controlled by the teacher, teacher designate or other user.

The machine is adapted for use in a large variety of subject areas and lends itself to a variety of approaches to a given subject area. The lesson work presented may be preprogrammed professionally or by the classroom teacher.

The machine is easily and rapidly set up for use. After the front and rear walls 2 and 3 respectively are lowered to their flat out-of-the-way position, as shown in phantom lines in FIG. 4, the several feed spools are easily inserted and the corresponding tapes readily threaded over the exposed backing plates for securement to the corresponding take-up spools. The set up procedure wastes relatively little valuable school time and can be done by pupils with a minimum of instruction. Once the machine is set up for use, it is easily and safely operated either by designated pupils or teacher. The provision of rigid backing plates 14, 15 and 18 behind the several tapes as viewed in the respective window openings 12, 13 and 17 makes it possible to use pointer or writing instruments to complement and/or supplement the taped presentation.

The machine of this invention comprises a minimum of parts most of which are readily fabricated from plastics to provide a machine which can be safely handled and used and whose cost is well within the budget normally allotted a classroom teacher.

Though somewhat differently programmed if so desired, the machine of this invention is also adaptable for use by a single pupil. In this instance the tape 21 as viewed in window opening 12 may be programmed with the study material along with appropriate questions, while the answers may be provided on tape 47 for viewing in window opening 17.

Various modes of carrying out the invention are contemplated as being within the scope of the following claims particularly pointing out and distinctly claiming the subject matter which is regarded as the invention.

1. In a teaching machine, a casing having a compartment therein disposed between the front wall and the rear wall of said casing, each of said walls having at least one opening therein providing said compartment with opposed viewing windows, means within said compartment for passing a corresponding flexible tape before the respective windows and comprising a feed spool and a take-up spool rotatably mounted within the compartment for supporting the opposite ends of each said tape, said feed spools and said take-up spools respectively being transversely spaced and aligned, a gear drivingly connected to each of the take-up spools, said take-up spool gears being identical and meshingly engaged to synchronously advance the respective tapes before the corresponding windows, and gears drivingly connected to each of the feed spools, said feel spool gears being identical and meshingly engaged to synchronously rewind the respective tapes.

2. The invention as set forth in claim 1 wherein the feed spools and take-up spools are mounted within the compartment with their axes disposed vertically so that the respective flexible tapes are advanced longitudinally within the compartment.

3. In a teaching machine, a casing having opposed walls and a pair of adjacent compartments disposed oppositely with respect to a transverse plane to said walls, said casing having corresponding windows in the opposed walls opening into one of said compartments and a window in at least one of the opposed walls opening into the other of said compartments, first and second visual intelligence indicia means exposed for viewing through the corresponding windows in the opposed walls opening into the one compartment, a third visual intelligence indicia means exposed for viewing through the window opening into the other compartment, means for movably supporting the first and second visual intelligence indicia means within the corresponding compartment, and drive means for synchronously moving the first and second visual intelligence indicia means and being independent from the third visual intelligence indicia means exposed for viewing through the window of the other compartment.

4. The invention as set forth in claim 3 wherein the first and second visual intelligence indicia means comprise flexible tapes mounted upon rolls rotatably disposed on opposite sides of the corresponding windows.

5. In a teaching machine, a casing including front and rear walls and having first and second adjacent compartments disposed oppositely with respect to a transverse plane to said walls, said casing having corresponding windows in the front and rear walls respectively opening into the first compartment and a window in the front wall opening into the second compartment, means exposing subject matter for study in the front window of the second compartment, means exposing questions pertaining to the subject matter for study in the front window of the first compartment, and means exposing the answers to said questions in the rear window of the first compartment, said respective means exposing questions and answers comprise flexible tapes which are synchronously driven and independently of the means exposing the subject matter for study.

6. In a teaching machine, a casing including front and rear walls and opposed end walls, partition means intermediate the end walls and dividing the casing into first and second compartments, a window in the front and rear wall respectively opening into the first compartment, a window in the front wall opening into the second compartment, means within the second compartment for passing a flexible tape before the corresponding window to present subject matter for study, drive means for said tape in the second compartment, means within the first compartment for passing corresponding flexible tapes before the respective windows to present questions pertaining to the subject matter for study past the front window and corresponding answers past the rear window, and drive means for said tapes in the first compartment to move the question and answer tapes synchronously and independently of the tape presenting the subject matter for study.

7. In a teaching machine, a casing including front and rear substantially parallel walls and opposed end walls, partition means intermediate the end walls and dividing the casing into first and second compartments, a window in the front and rear wall respectively opening into the first compartment, a window in the front wall opening into the second compartment, a flexible programmed tape for presentation of subject matter for study in said second compartment, spaced feed and take-up spools in said second compartment and adapted to pass said tape before the corresponding window, drive means for the spools in the second compartment, a flexible programmed tape for presentation of questions pertaining to the subject matter for study in said first compartment, a flexible programmed tape for presentation of answers to said questions in said first compartment, a feed spool and take-up spool in said first compartment for each of the respective tapes and adapted to pass the question tape before the front window and the answer tape before the rear window, said spools for the respective tapes in the first compartment being disposed to move the tapes in a common direction, and drive means for the spool in the first compartment to move the question and answer tapes synchronously and independently of the tape in the second compartment presenting the subject matter for study.

8. In a teaching machine; a casing including front and rear substantially parallel walls, opposed substantially parallel end walls, a generally flat top wall and a bottom; partition means intermediate the end walls and dividing the casing into first and second compartments; a window in the front and rear walls respectively opening into the first compartment; a window in the front wall opening into the second compartment; a flexible programmed tape for presentation of subject matter for study in said second compartment; a feed spool and take-up spool disposed in the second compartment on opposite sides of the corresponding window to pass said tape before said window; drive means for the spools in the second compartment; a flexible programmed tape for presentation of questions pertaining to the subject matter for study in the front window of said first compartment; a flexible programmed tape for presentation of answers to said questions in the rear window of said first compartment; transversely spaced and aligned vertically disposed feed spools for the question and answer tapes respectively disposed in the first compartment adjacent to one side edge of the corresponding windows; transversely spaced and aligned vertically disposed take-up spools for the question and answer tapes respectively disposed in the first compartment adjacent to the opposite side edge of the corresponding windows and in corresponding relation to the feed spools; said spools in the first compartment being adapted to move the respective tapes before the corresponding windows in a common direction; and drive means for the spools in the first compartment to move the question and answer tapes synchronously and independently of the tape presenting the subject matter for study in the second compartment.

9. The invention as set forth in claim 8 wherein access means are provided for each compartment to provide for replacement of the feed spools.

10. The invention as set forth in claim 8 wherein the front and rear casing walls are hinged to the bottom of the casing and swing downwardly to an out-of-the-way position providing ready access to the several compartments.

11. The invention as set forth in claim 8 wherein a rigid backing plate is provided in the several compartments in generally parallel spaced relation from each window and the respective tapes are threaded between the respective backing plates and the corresponding window walls.

12. The invention as set forth in claim 8 wherein the drive means for the spools in the first compartment are removable and extend through the top wall of the casing.

13. The invention as set forth in claim 8 wherein the drive means for the transversely spaced take-up spools in the first compartment includes corresponding removable shafts extending through the top wall of the casing and drivingly engaging the spools, identical gear members mounted on said shafts externally of the casing and being meshingly engaged, and means to rotate one of the gear members whereby to synchronously drive the take-up spools and advance the corresponding tapes; and wherein the drive means for the transversely spaced feed spools in the first compartment includes corresponding removable shafts extending through the top wall of the casing and drivingly engaging the feed spools, identical gear members mounted on said shafts externally of the casing and being meshingly engaged, and means to rotate one of the gear members whereby to synchronously drive the feed spools and rewind the corresponding tapes thereon.

14. The invention as set forth in claim 8 wherein the feed spool and take-up spool in the second compartment are horizontally disposed, vertically spaced and aligned and provide that the corresponding tape for presentation of subject matter for study moves at generally right angles to the question and answer tapes in the first compartment.

15. The invention as set forth in claim 14 wherein the drive means for the feed spool and take-up spool in the second compartment are removable and extend through the adjacent casing end wall.

References Cited
UNITED STATES PATENTS

| | | | |
|---|---|---|---|
| 1,840,692 | 1/1932 | Borowsky | 40—31 |
| 2,723,475 | 11/1955 | Santamaria | 40—86 |
| 3,007,100 | 10/1961 | Bettscher | 40—31 X |
| 3,153,862 | 10/1964 | Sawyer | 35—76 X |

EUGENE R. CAPOZIO, *Primary Examiner.*

W. GRIEB, *Assistant Examiner.*